United States Patent
Kelly et al.

(10) Patent No.: US 9,238,201 B2
(45) Date of Patent: Jan. 19, 2016

(54) OXYGEN TRANSPORT MEMBRANE SYSTEM AND METHOD FOR TRANSFERRING HEAT TO CATALYTIC/PROCESS REACTORS

(71) Applicants: Sean M. Kelly, Pittsford, NY (US); Brian R. Kromer, Buffalo, NY (US); Michael M. Litwin, Cheektowaga, NY (US); Lee J. Rosen, Buffalo, NY (US); Gervase Maxwell Christie, Amherst, NY (US); Jamie R. Wilson, Maynard, MA (US); Lawrence W. Kosowski, West Falls, NY (US); Charles Robinson, Lawtons, NY (US)

(72) Inventors: Sean M. Kelly, Pittsford, NY (US); Brian R. Kromer, Buffalo, NY (US); Michael M. Litwin, Cheektowaga, NY (US); Lee J. Rosen, Buffalo, NY (US); Gervase Maxwell Christie, Amherst, NY (US); Jamie R. Wilson, Maynard, MA (US); Lawrence W. Kosowski, West Falls, NY (US); Charles Robinson, Lawtons, NY (US)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 266 days.

(21) Appl. No.: 14/068,375
(22) Filed: Oct. 31, 2013

(65) Prior Publication Data
US 2014/0056774 A1 Feb. 27, 2014

Related U.S. Application Data

(60) Division of application No. 13/542,115, filed on Jul. 5, 2012, now Pat. No. 8,623,241, which is a continuation-in-part of application No. 13/179,279, filed on Jul. 8, 2011, now Pat. No. 8,349,214.

(51) Int. Cl.
*B01D 61/28* (2006.01)
*C01B 3/38* (2006.01)
*C01B 13/02* (2006.01)
(Continued)

(52) U.S. Cl.
CPC ............... *B01D 61/28* (2013.01); *B01J 8/0285* (2013.01); *B01J 19/2475* (2013.01); *B01J 19/2485* (2013.01); *C01B 3/384* (2013.01); *C01B 13/0251* (2013.01); *B01J 2208/00309* (2013.01); *B01J 2208/00504* (2013.01); *B01J 2208/00902* (2013.01); *B01J 2219/00117* (2013.01); *B01J 2219/00157* (2013.01); *C01B 2203/0233* (2013.01); *C01B 2203/0238* (2013.01); *C01B 2203/062* (2013.01); *C01B 2203/0822* (2013.01); *C01B 2203/0827* (2013.01); *C01B 2203/0883* (2013.01); *C01B 2203/1058* (2013.01); *C01B 2203/1241* (2013.01)

(58) Field of Classification Search
CPC combination set(s) only.
See application file for complete search history.

(56) References Cited

U.S. PATENT DOCUMENTS

| | | | |
|---|---|---|---|
| 6,048,472 | A | 4/2000 | Nataraj et al. |
| 6,110,979 | A | 8/2000 | Nataraj et al. |

(Continued)

*Primary Examiner* — Kaity Handal
(74) *Attorney, Agent, or Firm* — Ralph J. Mancini

(57) ABSTRACT

A method and apparatus for producing heat used in a synthesis gas production process is provided. The disclosed method and apparatus include a plurality of tubular oxygen transport membrane elements adapted to separate oxygen from an oxygen containing stream contacting the retentate side of the membrane elements. The permeated oxygen is combusted with a hydrogen containing synthesis gas stream contacting the permeate side of the tubular oxygen transport membrane elements thereby generating a reaction product stream and radiant heat. The present method and apparatus also includes at least one catalytic reactor containing a catalyst to promote the steam reforming reaction wherein the catalytic reactor is surrounded by the plurality of tubular oxygen transport membrane elements. The view factor between the catalytic reactor and the plurality of tubular oxygen transport membrane elements radiating heat to the catalytic reactor is greater than or equal to 0.5.

7 Claims, 12 Drawing Sheets

(51) Int. Cl.
  *B01J 19/24*   (2006.01)
  *B01J 8/02*   (2006.01)

(56) References Cited

U.S. PATENT DOCUMENTS

| | | |
|---|---|---|
| 6,114,400 A | 9/2000 | Nataraj et al. |
| 6,296,686 B1 | 10/2001 | Prasad et al. |
| 6,402,988 B1 | 6/2002 | Gottzmann et al. |
| 7,427,368 B2 * | 9/2008 | Drnevich ............... 252/373 |
| 2002/0073938 A1 | 6/2002 | Bool et al. |
| 2006/0029539 A1 | 2/2006 | Dutta et al. |
| 2007/0041894 A1 | 2/2007 | Drnevich |
| 2007/0065687 A1 | 3/2007 | Kelly et al. |
| 2007/0292342 A1 * | 12/2007 | Hemmings et al. ........... 423/651 |
| 2008/0141672 A1 * | 6/2008 | Shah et al. ............... 60/648 |
| 2008/0302013 A1 | 12/2008 | Repasky et al. |

* cited by examiner

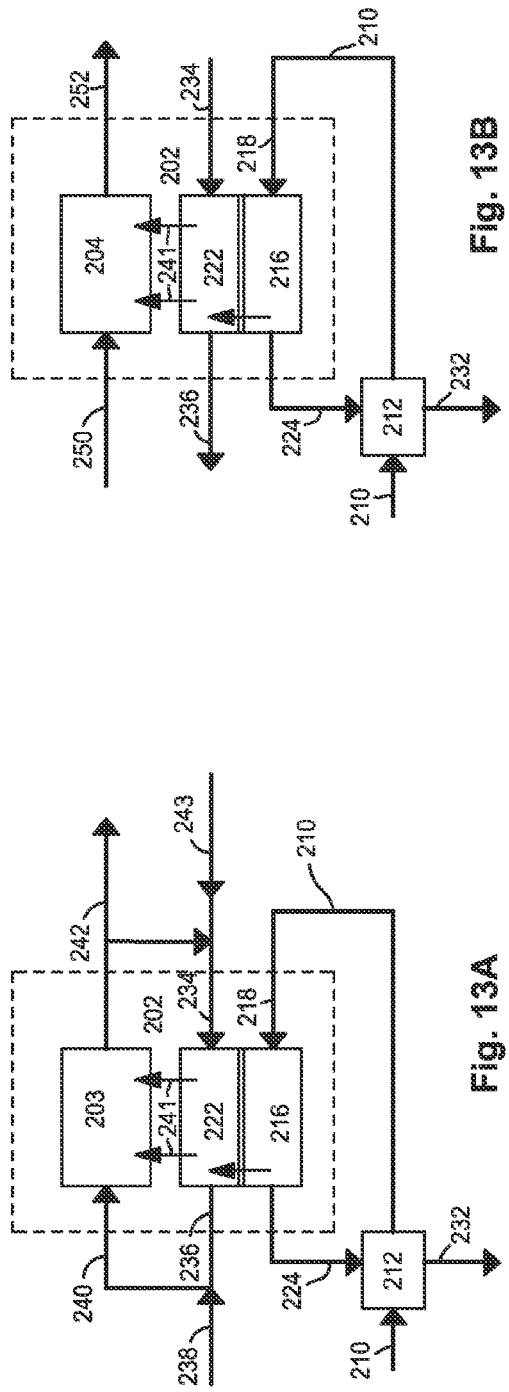

OXYGEN TRANSPORT MEMBRANE SYSTEM AND METHOD FOR TRANSFERRING HEAT TO CATALYTIC/PROCESS REACTORS

CROSS REFERENCE TO RELATED APPLICATIONS

This application is a divisional application of prior U.S. application Ser. No. 13/542,115, filed Jul. 5, 2012, now allowed, which is a continuation-in-part application of U.S. Pat. No. 8,349,214 which issued on Jan. 8, 2013, the entire contents of which is incorporated herein by reference in its entirety.

U.S. GOVERNMENT RIGHTS

This invention was made with Government support under Cooperative Agreement No. DE-FC26-07NT43088, awarded by the United States Department of Energy. The Government has certain rights in this invention.

FIELD OF THE INVENTION

The present invention provides a method and apparatus for producing radiant heat used in a synthesis gas production process or other catalytic reactor process, and more particularly for use in producing synthetic gas for a methanol production process or synthetic fuel production process. More specifically, the present method and apparatus utilize a plurality of tubular oxygen transport membrane elements disposed in proximate to or surrounding catalytic reforming reactor wherein permeated oxygen is combusted with a hydrogen containing synthesis gas stream contacting the permeate side of the tubular oxygen transport membrane elements thereby generating radiant heat sufficient to promote the desired catalytic reaction to produce synthetic gas.

BACKGROUND

Synthesis gas containing hydrogen and carbon monoxide is produced for a variety of industrial applications, for example, the production of hydrogen, chemicals and synthetic fuel production. Conventionally, the synthesis gas is produced in a fired reformer in which natural gas and steam is reformed to the synthesis gas in catalyst filled reformer tubes. The endothermic heating requirements for steam methane reforming reactions occurring within the reformer tubes are provided by burners firing into the furnace that are fueled by part of the natural gas. In order to increase the hydrogen content of the synthesis gas, the synthesis gas can be subjected to water-gas shift reactions to react residual steam in the synthesis gas with the carbon monoxide.

Such steam methane reformers are optimized for hydrogen production and typically are fed with a reactant stream containing hydrocarbons and steam at a steam-to-carbon ratio of 1.5 to 3.5, depending on the quantity of carbon dioxide in the reactant stream, to thereby produce the synthesis gas at a hydrogen to carbon monoxide ratio of 3 or higher. This is not optimal for the production of synthesis gas for synthetic fuel production such as in Fisher-Tropsch or methanol synthesis where the hydrogen to carbon monoxide ratio of 1.8 to 2.0 within the synthesis gas is more desirable. Consequently, where synthetic fuel production is a desired use of the synthesis gas, an autothermal reformer is typically used in which the steam-to-carbon ratio of the reactant is typically between 0.5 and 0.6. In such a reactor, oxygen is used to combust part of the feed to create additional steam and heat to reform the hydrocarbons contained in the feed to the synthesis gas. As such, for a large scale installation, an air separation plant may be required to supply the oxygen.

As can be appreciated, conventional methods of producing a synthesis gas such as have been discussed above are expensive and involve complex installations. In order to overcome the complexity and expense of such installations it has been proposed to generate the synthesis gas within reactors that utilize an oxygen transport membrane to supply oxygen and thereby generate the heat necessary to support endothermic heating requirements of the steam methane reforming reactions. A typical oxygen transport membrane has a dense layer that, while being impervious to air or other oxygen containing gas, will transport oxygen ions when subjected to an elevated operational temperature and a difference in oxygen partial pressure across the membrane. This difference in oxygen partial pressure can be produced by compressing the supplied air or from the combustion of hydrocarbons fed to a permeate side of the membrane and supported by permeated oxygen or a combination of the two methods.

For example, in U.S. Pat. No. 6,048,472 and U.S. Pat. No. 6,110,979; a reactant gas feed is combined with steam. The reactant gas feed can be natural gas, naptha or other hydrocarbon containing gas. This combined feed stream is then heated and introduced into an adiabatic pre-reformer to produce an intermediate stream that contains carbon monoxide, carbon dioxide, steam, hydrogen, and methane. The intermediate stream can be combined with carbon dioxide and steam. The resulting reactant stream is then introduced with air into reactant and oxidant sides, respectively, of an oxygen transport membrane reformer. The oxygen transport membrane reformer has an oxygen transport membrane separating the reactant and oxidant sides of the reformer. The reactant gas reacts with oxygen that has permeated through the oxygen transport membrane to produce a synthesis gas. Preferably a reforming catalyst is applied to at least a portion of the reactant side surface of oxygen transport membrane or packed into the reactant side to promote the reforming reactions.

U.S. Pat. No. 6,114,400 discloses an integrated system in which an oxygen transport membrane reformer is connected to a downstream reactor such as a Fischer-Tropsch reactor to produce a liquid product. In all of these patents the presence of the pre-reforming stage prevents breakdown of higher order hydrocarbons present in the reactant feed stream and the resulting carbon deposition that would otherwise occur had the higher order hydrocarbons been fed directly to the reactor. Such carbon deposition will degrade the reforming catalyst used in connection with the oxygen transport membrane reactor.

U.S. Pat. No. 6,296,686 discloses a reactor in which heat is supplied to an endothermic reforming reaction inside a reaction passage separated from an air passage by an oxygen transport membrane. A reactant gas, for example, methane flows through the reaction passage is combusted with permeated oxygen to provide the heat to support the reforming reaction. Further heat is supplied to the reforming reaction by either combusting a fuel with retentate or a fuel with a second permeate produced by another oxygen transport membrane or within a combustion passage. Alternatively, an oxygen transport membrane can be situated between an air passage and a combustion passage and a barrier is located between the combustion passage and the reaction passage. In such case, the oxygen transport membrane supplies oxygen permeate to support combustion of a fuel in a combustion passage to generate heat that is transferred to the reaction passage.

US Patent Application Serial No. 2008/0302013 discloses a staged reactor system having a sequential arrangement of reactor stages to produce a synthesis gas product. Each of the reactor stages has an oxidant side separated from a reactant side by an oxygen transport membrane. The reactant sides are linked together so that a reactant stream containing methane and steam is introduced into the system and sequentially reacted with oxygen permeating through the membrane to produce a synthesis gas product for use in a downstream reactor such as a Fischer-Tropsch reactor. Catalyst beds can be located within the reactant side of the reactor stages or can be positioned between the reactor stages. Both steam and a reactant gas from a downstream process utilizing the synthesis gas can be introduced into the feed between stages. The presence of the multiple stages allows the temperature within each of the reaction stages to be controlled to prevent the oxygen transport membrane from being degraded and to control the deposition of soot throughout the membrane system.

US Patent Application Serial No. 2006/0029539 discloses other examples of staged reactor systems that can employ oxygen transport membranes in which the air or other oxygen containing stream fed to each of the stages can be controlled to control the temperatures and conversation that can be obtained in producing a synthesis gas.

The problem with all of the above-identified prior art systems is that an oxygen transport membrane will operate at high temperatures of about 900° C. to 1100° C. Where hydrocarbons such as methane and other higher order hydrocarbons are subjected to such temperatures carbon formation will occur. Additionally, where oxygen is supplied by an oxygen transport membrane directly to the reactor, the surface area of the membrane is distributed throughout the reactor. As such, the distribution of oxygen is non-uniform throughout the reactor. In other words, sufficient quantity of oxygen is not generally available at or near the entrance to the reactor. This also results in an aggravated carbon formation problem at the entrance that is especially the case at low steam-to-carbon ratios. In any case, a reactant containing methane and steam will produce a relatively low oxygen flux across the membrane resulting in the membrane area required for such a reactor to be larger and it will add to the expense and complexity in such a reactor or system. Additionally, a steam methane reforming catalyst must be periodically replaced. In prior art reactor designs where the catalyst is employed adjacent to the oxygen transport membrane, catalyst replacement becomes an expensive if not impractical exercise.

The present invention, in one or more aspects, provides a method and apparatus in which the oxygen transport membrane is not directly used to react the steam and methane components of the reactant feed, but rather, to generate the heat required to support endothermic heating requirements of steam methane reforming reactions within a separate reactor, thus overcoming the above-identified problems.

SUMMARY OF THE INVENTION

The present invention may be characterized as an oxygen transport membrane module for producing heat used in a synthesis gas production process. The module comprises a plurality of tubular oxygen transport membrane elements each having a permeate side located on an outer surface and a retentate side located on an inner surface of the tubular oxygen transport membrane element. The tubular oxygen transport membrane elements is configured or adapted to separate oxygen from an oxygen containing stream contacting the retentate side of the membrane elements and produce the oxygen on the permeate side of the membrane elements. The permeated oxygen is combusted with a hydrogen containing synthesis gas stream contacting the permeate side of the tubular oxygen transport membrane elements thereby generating radiant heat, a reaction product stream and a retentate stream. The present module also includes at least one catalytic reactor disposed proximate the plurality of tubular oxygen transport membrane elements. Preferably, the central reactor comprises at least one reactor tube containing a catalyst to promote the steam methane reforming reaction and the central reactor tube is surrounded by the plurality of tubular oxygen transport membrane elements. The catalytic reactor or reactor tubes are configured or adapted to receive the reaction product stream, a hydrocarbon containing reactant steam and the radiant heat and to react the reaction product stream with the hydrocarbon containing reactant stream in the presence of the radiant heat to produce a synthesis gas stream. The view factor between the catalytic reactor and the plurality of tubular oxygen transport membrane elements radiating heat to the catalytic reactor is greater than or equal to 0.5.

In one embodiment of the invention, the module further comprises: at least one inlet manifold connected to one or more of the plurality of the tubular oxygen transport membrane elements, at least one outlet manifold connected to one or more of the plurality of the tubular oxygen transport membrane elements. The inlet manifolds are configured or adapted to introduce the hydrogen containing synthesis gas stream to the permeate side of the tubular oxygen transport membrane elements and the oxygen containing stream to the retentate side of the tubular oxygen transport membrane elements whereas the outlet manifolds are configured to receive the steam containing reaction product stream; and wherein the outlet manifolds are connected to the inlet of the at least one reactor tube to deliver the reaction product stream to the reactor tube. In this embodiment, the outlet manifolds are further fluidically coupled with the hydrocarbon containing stream to mix with the reaction product stream, and optionally steam to form a combined stream that is delivered to the reactor tube to undergo the steam methane reforming reaction.

In another aspect, the present invention may be characterized as a method for producing a synthesis gas comprising the steps of: (i) separating oxygen from an oxygen containing stream with a plurality of tubular oxygen transport membrane elements each having a permeate side located on an outer surfaces and a retentate side located on an inner surfaces of the tubular oxygen transport membrane element, the oxygen containing stream contacting the retentate side of the membrane elements and produce the separated oxygen on the permeate side; (ii) combusting the permeated oxygen with a hydrogen containing synthesis gas stream contacting the permeate side of the tubular oxygen transport membrane elements to generate radiant heat, a reaction product stream and a retentate stream; (iii) combining the reaction product stream with a hydrocarbon containing reactant steam and adding steam to the hydrogen containing synthesis gas stream, the reaction product stream, or the combined stream to form a steam containing combined stream; (iv) reacting the steam containing combined stream in at least one catalytic reactor in the presence of the radiant heat to produce a synthesis gas stream, preferably wherein the radiant heat maintains the temperature of the reaction in the catalytic reactor between about 900° C. and about 1100° C.; and (v) recycling a portion of the produced synthesis gas to form the hydrogen containing synthesis gas stream. The catalytic reactor is disposed proximate the plurality of tubular oxygen transport membrane elements such that the view factor between the catalytic reactor and the plurality of tubular oxygen transport membrane elements radiating heat to the catalytic reactor is greater than or equal to 0.5. Optionally, the present method may also include the step of adding a carbon dioxide input to the reactant stream or the steam containing combined stream.

In one embodiment of the disclosed method, the synthesis gas is used in a methanol production process wherein the combined stream has a steam-to-carbon ratio of between about 0.5 and 0.6 and the synthesis gas has a hydrogen to carbon monoxide ratio of between about 1.8 to 2.0. Alternatively, the synthesis gas is used in a synthetic fuel production process (e.g. Fischer-Tropsch process) wherein the combined stream has a steam-to-carbon ratio of between about 0.5 and 0.6 and the synthesis gas has a hydrogen to carbon monoxide ratio of between about 1.8 to 2.0. Controlling the steam-to-carbon ratio of the combined stream and the hydrogen to carbon monoxide ratio of the synthesis gas is preferably accomplished by adjusting the addition of steam and/or carbon dioxide to the various streams, as described herein.

For example, a supplemental steam stream can be introduced into at least one of the hydrogen containing stream and the reactant stream. Similarly, a carbon dioxide stream can be introduced into at least one of the heated reaction product stream, the reactant stream, the hydrogen containing stream and the combined stream to obtain some dry-reforming within the catalytic reactor.

The step of recycling a portion of the produced synthesis gas to form the hydrogen containing synthesis gas stream can be accomplished by dividing the synthesis gas product into a first portion to be used in downstream processes such as a methanol production or synthetic fuel production and a second portion of the synthesis gas stream that is recycled to the permeate side of the oxygen transport membrane elements. Alternatively, as the present invention contemplates multiple catalytic reactors, different catalytic reactors can be used to produce the first portion of synthesis gas to be used in downstream processes and the second portion of the synthetic gas to be recycled to the permeate side of the oxygen transport membrane elements.

An important feature of the present inventions is that the retentate stream is heated from the combustion of the permeated oxygen with the hydrogen containing synthesis gas stream and heat from the heated retentate stream is indirectly transferred to the at least one catalytic reactor and more preferably used to preheat the incoming oxygen containing stream. For example, to indirectly heat the incoming oxygen containing stream, a heat exchanger can be configured such that the oxygen containing stream is preheated through indirect heat exchange with the heated retentate stream prior to being introduced to the retentate side of the at least one oxygen transport membrane element.

Unlike the prior art, the oxygen transport membrane is used to generate heat and potentially steam for the steam methane reforming and such heat is transferred to a separate catalytic reactor. A major advantage in such an arrangement is that the combustion of synthesis gas with permeated oxygen is a far more rapid reaction than methane or methane and higher order hydrocarbons. In the prior art, generally a pre-reformed stream that would be mostly methane and steam is combusted at the permeate side of an oxygen transport membrane that also contains a catalyst to promote steam methane reforming reactions. Consequently, a reactive system in accordance with the present invention may use far less oxygen transport membrane area than a prior art reactor. This translates into a reactive system in accordance with the present invention that is less complex and expensive than prior art systems and further, is less susceptible to failure. Additionally, since the catalytic reactor is a separate component within the system or module, the catalyst can more easily be replaced than in prior art systems in which the catalyst is incorporated directly into an oxygen transport membrane element.

BRIEF DESCRIPTION OF THE DRAWINGS

While the specification concludes with claims distinctly pointing out the subject matter that applicants regard as their invention, it is believed that the invention will be better understood when taken in connection with the accompanying drawings in which:

FIG. 12 is a graph showing heat flux, temperatures, area ratios and view factors for various module configurations; and.

FIGS. 13A, 13B, and 13C depict schematic illustrations of thermally integrated oxygen transport membrane and catalytic/process reactor modules in accordance with an aspect of the present invention.

For the sake of avoiding repetition, some of the common elements in the various Figures utilize the same numbers where the explanation of such elements would not change from Figure to Figure.

DETAILED DESCRIPTION

Figure 1:
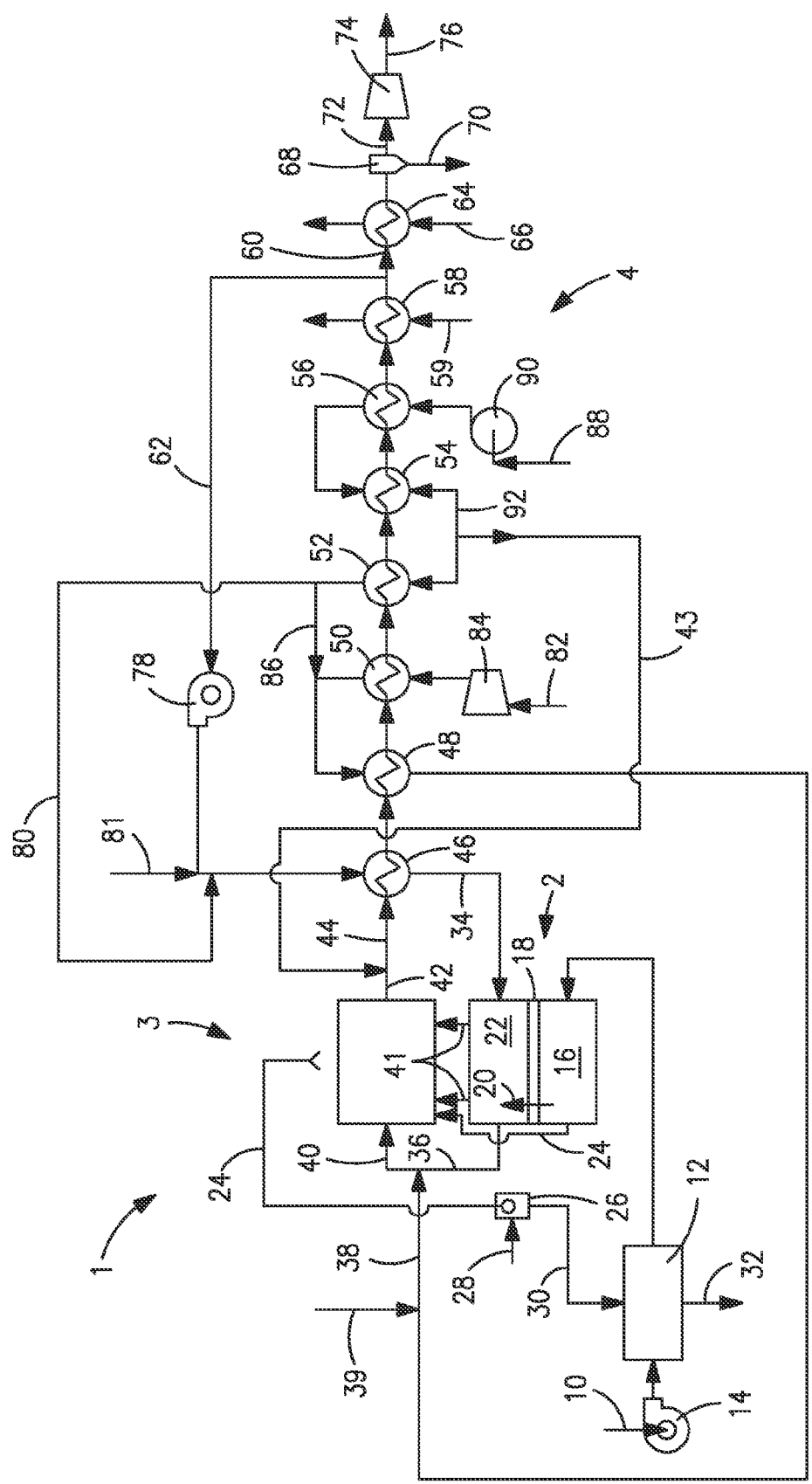
FIG. 1 is a schematic illustration of an apparatus designed to carry out a method in accordance with the present invention.

With reference to FIG. 1, an apparatus 1 is illustrated that is designed to produce a synthesis gas product through the steam methane reforming of hydrocarbons. Apparatus 1 includes one or more oxygen transport membrane elements of which oxygen transport membrane element 2 is illustrated. Oxygen transport membrane element 2 supplies heat by radiation and convective heat transfer to supply the endothermic heating requirements of a catalytic reactor 3 within which the hydrocarbons and steam are reacted to produce a synthesis gas. As well known in the art, at high temperatures, from 700 to 1100° C., steam will react with methane to yield a synthesis gas that contains hydrogen and carbon monoxide. Catalytic reactor 3, as would be known in the art, contains a catalyst, typically nickel, to promote such steam methane reforming reaction. Additionally, water-gas shift reactions occur in which the carbon monoxide will react with the steam to produce carbon dioxide and hydrogen. Although the water-gas shift reaction is exothermic, the steam methane reforming reaction is endothermic and requires heat to be supplied to the catalytic reactor. Carbon dioxide will also react with methane in so-called dry reforming reactions to also produce the synthesis gas. In this regard, carbon dioxide can be added for such purpose. The resulting synthesis gas is a mixture of hydrogen, carbon monoxide, carbon dioxide and water and other known constituents such as unreacted methane known in the art as methane slip. The synthesis gas is optionally cooled and compressed within a convective section 4 to produce the synthesis gas product and a recycle stream that is fed back to the oxygen transport membrane device 2 for combustion with permeated oxygen to generate the necessary heat.

As is apparent from the above discussion, apparatus 1 functions in an analogous manner to an autothermal reformer in which oxygen is added to the reactant to partially oxidize some of the hydrocarbons contained in the reactant to generate the heat to support the overall endothermic heating requirements for the steam methane reformer. This being said, the combustion occurring within the oxygen transport membrane device 2 will typically be at least 50 percent complete so that there is virtually no molecular oxygen that will be left over to react with the hydrocarbons because otherwise sufficient heat will not be generated by the oxygen transport membrane device 2 to support endothermic heating requirements required for the steam methane reforming reactions occurring within the catalytic reactor 3. A further point to be mentioned, is that if an operation were attempted within apparatus 1 in which the hydrocarbons contained within reactant were combusted within the oxygen transport membrane device 2, such a reaction will typically be so slow that it is impractical if not impossible to generate the heat required for subsequent endothermic steam methane reforming because the hydrocarbons will not react to an appreciable extent within an oxygen transport membrane. The present invention takes advantage of the fact that oxidation of hydrogen and carbon monoxide is a particularly rapid reaction that part of the synthesis gas generated from the catalytic reactor can be used to generate heat while still allowing for a reasonable production rate of the synthesis gas product from apparatus 1.

More specifically, an oxygen containing stream 10 can be introduced by means of a blower 14 into a heat exchanger 12 for purposes of preheating the oxygen containing stream 10. Heat exchanger 12 could be a convective type heat exchanger or a high efficiency, cyclic regenerative type heat exchanger. Oxygen containing stream 10 can be ambient air or possibly a stream bled from a compressor section of a gas turbine. In the latter case, blower 14 and heat exchanger 12 might not be necessary. It is to be noted that no compression of the oxygen containing stream 10 is required or even desired. The blower 14 is provided to simply motivate the oxygen containing stream 10 through apparatus 1 against pressure drops produced by piping and the like. The heated oxygen containing stream 10 is then contacted with the retentate side 16 of oxygen transport membrane element 18 incorporated into the oxygen transport membrane device 2. Although one such oxygen transport membrane element 18 is illustrated, as would occur to those more skilled in the art, there could be many of such elements in an industrial application of the present invention and the oxygen transport membrane device 2 could be oxygen transport membrane tubes 122 incorporated into a module 120 to be discussed hereinafter. As will also be discussed, the oxygen transport membrane element 18 is formed of a ceramic capable of conducting oxygen ions at an elevated operational temperature. The oxygen ions permeate through the oxygen transport membrane element 18 in the direction of arrowhead 20 to the permeate side 22 of the oxygen transport membrane element 18.

As a result of the separation of the oxygen and combustion occurring at the permeate side 22 of oxygen transport membrane element 18, a heated retentate stream 24 is formed that, after transferring heat to catalytic reactor 3, can optionally can be introduced into a duct burner 26 and used to support combustion of a fuel stream 28 to produce a heated flue gas stream 30 that is introduced into the heat exchanger 12 for purposes of preheating the oxygen containing stream 10 through indirect heat exchange. The resulting cooled flue gas stream 32 is discharged from heat exchanger 12. Although not illustrated, if necessary, supplemental air can be injected into duct burner 26 to support combustion. It is to be noted that embodiments are possible in which duct burner 26 is not used and the retentate stream is directly introduced into the heat exchanger 12 for purposes of pre-heating the oxygen containing stream 10. In this regard, oxygen containing stream 10 could contact retentate side 16 of oxygen transport membrane 18 at ambient temperature and without preheating. However, this would not be thermally efficient.

A hydrogen containing stream 34 is introduced into the permeate side 22 of the oxygen transport membrane element 18 that is oxidized though combustion of permeated oxygen to produce a heated combustion product stream 36. The heated combustion product stream 36 is combined with a reactant stream 38 to produce a combined stream 40 that contains steam and hydrocarbons that is introduced into the catalytic reactor 3 where such stream is subjected to steam methane reforming reactions to produce a synthesis gas stream 42. It is to be noted that embodiments of the present invention are possible in which the reactant stream only contains hydrocarbons such as methane and lower order alkanes and the steam is contributed solely by the heat combustion product stream. As will be discussed, however, it is preferable, however, that steam be added to both the reactant stream 38, the heated combustion product stream 42 and the hydrogen containing stream 34. Further, as illustrated, a carbon dioxide stream 39 may optionally be added to the reactant stream 38 or the combined stream 40 or the heated combustion product stream 36 or possibly the hydrogen containing stream 34 as a stream 81, upstream of heat exchanger 46 for purposes of enhancing dry reforming occurring within catalytic reactor 3.

The combustion of the hydrogen containing stream 34 produces heat that through radiation as generally indicted by arrowheads 41 which together with the convective heat transfer provided by heated retentate stream 24 contacting the catalytic reactor 3, heats the catalytic reactor 3 to at least assist in supplying endothermic heating requirements of the steam methane reforming reactions occurring in catalytic reactor 3. If necessary, endothermic heating requirements can also be supplied through indirect heating with the use of auxiliary burners combusting part of the reactant stream 38 and firing at the catalytic reactor 3.

Synthesis gas stream 42 contains hydrogen, carbon monoxide, steam and carbon dioxide and as discussed above, other components such as possible methane slip. Convective section 4 is designed to cool the synthesis gas stream 42 and recycle part of the synthesis gas stream to form the hydrogen containing stream 34. Practically, it is necessary to cool the synthesis gas stream 42 before recycling such stream in a recycle blower 78. Convective section 4 is also designed such that in cooling the synthesis gas stream, various feed streams are preheated and process steam is generated.

In the cooling of synthesis gas stream 42, a steam stream 43 is combined within the synthesis gas stream 42 to produce a quenched synthesis gas stream 44. Alternatively, water could also be added to synthesis gas stream 42 to add steam to the process and also increase the temperature reduction due to the latent heat of vaporization for the added water. This step is important not only to cool the synthesis gas stream 42, but also to prevent coking of the synthesis gas upon cool down.

The quenched synthesis gas stream 44 is successively further cooled in a convective heat exchange network that includes heat exchangers 46, 48, 50, 52, 54 and 56 and water cooled heat exchangers 58 and 64. The quenched synthesis gas stream 44 after having been cooled in water cooled heat exchanger 58 by a cooling water stream 59, is divided into a first part 60 and a second part 62. First part 60 is further cooled within the water cooled heat exchanger 64 by cooling water stream 66 and the resulting stream is introduced into a knock-out drum 68 from which a condensate stream 70 is drained to produce a cooled synthesis gas stream 72. Cooled synthesis gas stream 72 is optionally compressed in a compressor 74 to produce a synthesis gas product stream 76 that forms the synthesis gas product. The second part 62 is recirculated back to the permeate side 22 of the oxygen transport membrane element 18 by means of a recirculation blower 78. Optionally, a first supplementary steam stream 80 is added to the second part 62 to form the hydrogen containing stream 34 that is preheated within heat exchanger 46 through indirect heat exchange with the quenched synthesis gas stream 44.

A hydrocarbon containing stream 82, that can be natural gas and more preferably, natural gas that has been pre-reformed in an adiabatic pre-reformer, is compressed in a feed compressor 84 and then preheated in heat exchanger 50 that serves as a fuel preheater. It is to be mentioned that where natural gas is used, it will typically contain unacceptably high level of sulfur species. While there are sulfur tolerant catalysts that can be used in catalytic reactor 3, in most cases the natural gas would have to be hydro-treated to remove the sulfur content. Further, since natural gas contains alkenes that will break down at high temperature to form carbon that can deactivate the catalyst, the steam to carbon ratio of the stream entering catalytic reactor 3 would have to be carefully controlled to prevent coking of the catalyst. In this regard, other possible hydrocarbon containing feeds include associated gas, LPG, naptha. The resulting heated stream can be combined with a second supplementary steam stream 86 to form the reactant stream 38 that is further heated in heat exchanger 48 through indirect heat exchange with the quenched synthesis gas stream 44 after having passed through heat exchanger 46. The first and second supplementary steam streams 80 and 86 are formed by pumping a boiler feed water stream 88 in a feed water pump 90 and then passing the pressurized stream through heat exchanger 56 that acts as a boiler feed water heater and then through heat exchanger 54 that serves as a boiler to create saturated steam and finally through a heat exchanger 52 that serves as a super heater to produce a superheated steam stream. One portion of the saturated steam stream 92 forms steam stream 43 and the other portion passes through heat exchanger 52 and is superheated and then, subsequently divided into the first and second supplementary steams streams 80 and 86.

As can be appreciated, in possible applications of the present invention, convective section 4 may not be present where the synthesis gas is desired at high temperature. Further, convective section 4 could be simplified by providing appropriate means to cool the synthesis gas before recycling part of the same back to the permeate side 22 of the oxygen transport membrane. For example, the use of water cooled heat exchangers alone or preferably in combination with steam stream 43 or other quench stream.

Figure 2:
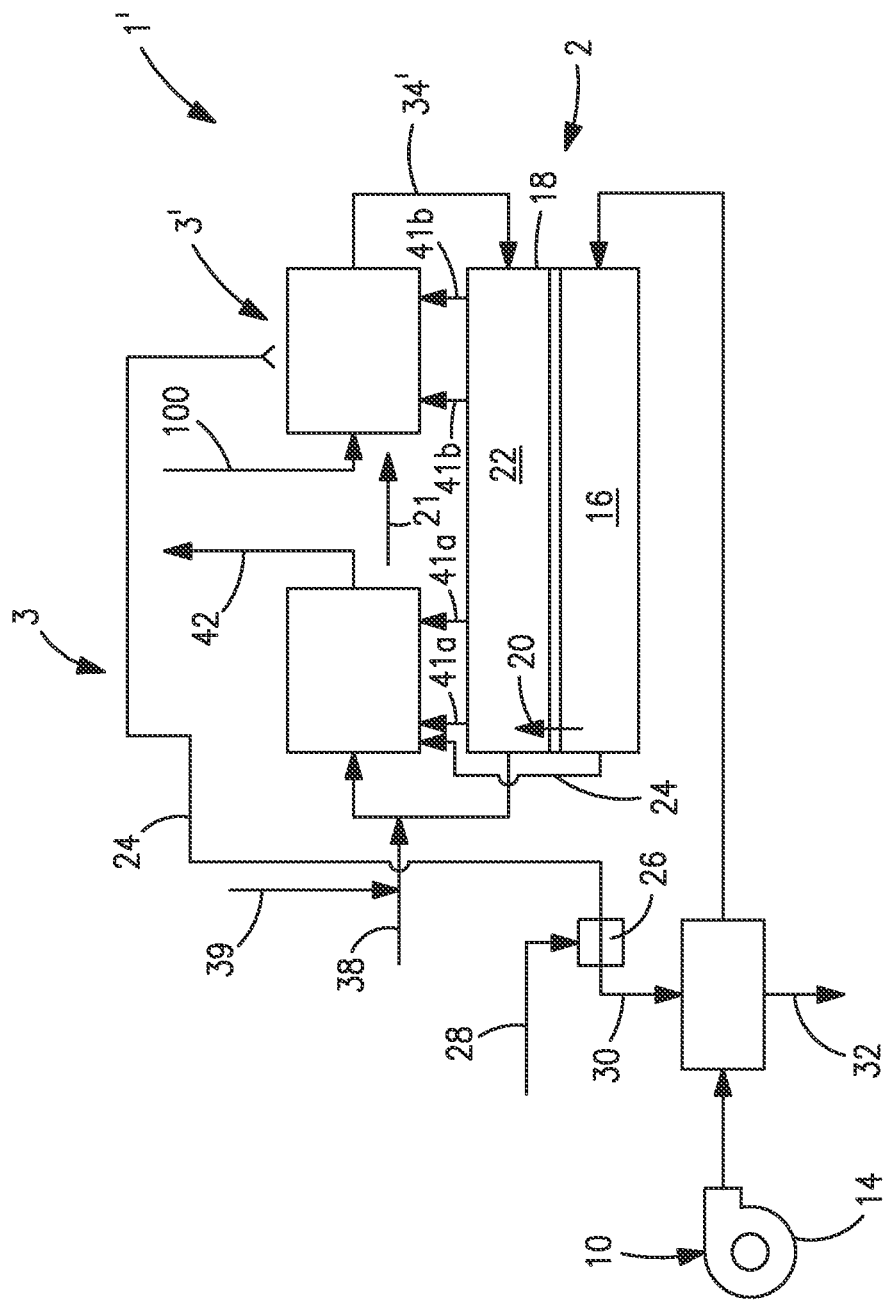
FIG. 2 is a schematic illustration of an alternative embodiment of an apparatus designed to carry out a method in accordance with the present invention.

With reference to FIG. 2, an alternative embodiment of the apparatus shown in FIG. 1 is indicated as apparatus 1'. In apparatus 1', a hydrogen containing stream 34' is produced by reacting a subsidiary reactant stream 100 in a reactor 3'. Subsidiary reactant stream could be a stream containing steam and fuel in a higher net steam-to-carbon ratio than the reactant stream 38 fed into catalytic reactor 3. Reactor 3' would be a catalytic reactor designed to react the hydrocarbons and steam to a sufficient extent that the hydrogen containing stream 34' is a synthesis gas that contains methane present in an amount of no greater than 20 percent by volume. For example, the fuel could be pre-reformed natural gas having a methane content of 80% or greater, that is reacted with steam to reduce the methane content to below 20 percent by volume.

Reactor 3' could be thermally integrated with the oxygen transport membrane element 2 and as such, heat is radiated from the oxygen transport membrane element 2 to both the reactor 3 and the reactor 3' as indicated by arrowheads 41*a* and 41*b*, respectively. Further, convective heat transfer occurs through indirect heat transfer produced by contact of the heated retentate stream 24 with both the catalytic reactor 3 and 3'. However, embodiments of the present invention are possible in which reactor 3' are not be thermally integrated with reactor 3. Synthesis gas stream 42 can then be further processed in convective system 4 or potentially could be used in a process that required the synthesis gas stream 42 at high temperature. In most cases, however, a water stream or steam stream 43 would be introduced into synthesis gas stream 42 for purposes of lowering the temperature of such stream. Additionally, it is also possible to integrate the apparatus 1' with recirculation of part of the synthesis gas produced by reactor 3 by the use, for example, of a convective system such as convective system 4. It is also to be noted that where there exists a suitable hydrogen containing stream 34', such as a hydrogen product stream from a conventional steam methane reformer, the same could be introduced into the permeate side 22 of an oxygen transport membrane element 2 without the use of reactor 3' and subsidiary reactant stream 3'. However, as indicated above, the hydrogen containing stream 34 or 34' or any hydrogen containing stream used for such purpose is a synthesis gas that has been sufficiently processed so as to contain no more than 20 percent methane by volume. Any increase in methane beyond this point is disadvantageous because it does not react at high rates relative to hydrogen and carbon-monoxide, and this will generally result in reduced overall oxygen transport. Additionally, issues with coking may be present.

As has been discussed above, the hydrogen to carbon ratio of the synthesis gas product produced by apparatus 1 or apparatus 1' for that matter, is the central object of the control for of such apparatus. For instance, a hydrogen to carbon ratio of about 2.0 in the synthesis gas product is required for direct integration with a Fisher-Tropsch gas to liquid plant. There are 3 control handles that will affect the hydrogen-to-carbon ratio of the process and apparatus as has been discussed above. Assuming fixed carbon input and hydrogen input from fuel, input steam, input oxygen, and input carbon (not in fuel) can be adjusted to in turn control the hydrogen-to-carbon ratio in the synthesis gas product. Steam may be added anywhere in either apparatus 1 or 1'. This steam provides additional hydrogen to the process and thus, minimizing steam reduces hydrogen to carbon ratio of the synthesis gas product. Oxygen is input through steam, carbon dioxide and as molecules transferred across the oxygen transport membrane 18. Oxygen input from these sources, excepting steam, will generally reduce hydrogen-to-carbon monoxide ratio of the synthesis gas product. Hydrogen input is from steam and hydrogen contained in the reactant stream 38. Decreasing steam and decreasing hydrogen-to-carbon ratio of the fuel (increasing carbon content) will reduce hydrogen-to carbon monoxide ratio of the synthesis gas product.

The process design incorporated into apparatus 1 or 1' allows the steam input to be reduced while maintaining margin on coke formation within the process. If carbon content can be increased in the reactant stream 38, then hydrogen-to-carbon monoxide may be reduced further. The reactant stream 38, as discussed above, is generally comprised of steam and pre-reformed natural gas. A carbon containing gas stream, for instance, stream 39, may be combined with the reactant stream 38 to reduce hydrogen-to-carbon ratio of the reactant stream 38. Carbon dioxide input at the reactant stream is particularly valuable in reducing the hydrogen to carbon ratio in the synthesis gas product. Stream 39 may be a carbon dioxide rich tail gas generated from the process, or can be recycled, or a carbon-dioxide rich gas imported from a nearby process. Having said this, however, the present invention is equally applicable where hydrogen is the desired product and therefore, the hydrogen to carbon ratio is optimized for such purpose.

Figure 3:
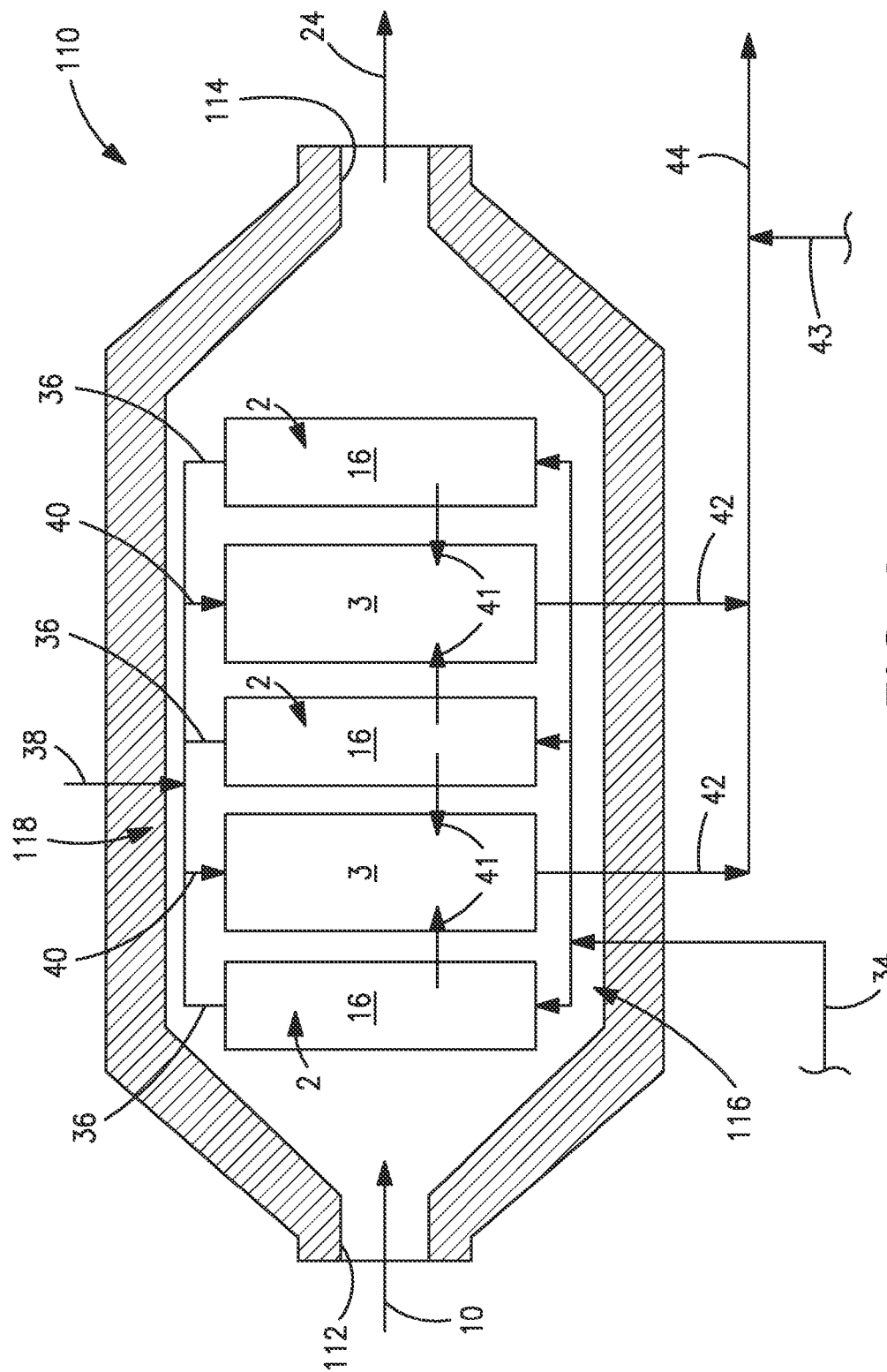
FIG. 3 is a fragmentary, schematic illustration of the apparatus of FIG. 1 showing an arrangement of oxygen transport membranes and catalytic reactors within an elongated, insulated housing.

With reference again to FIG. 1 and with additional reference to FIG. 3, the thermal integration of oxygen transport membrane element 2 and reactor 3 can be accomplished in an elongated insulated reactor housing 110 that is provided with opposed openings 112 and 114 provided within opposite ends thereof. Elongated insulated reactor housing 110 houses the oxygen transport membrane element 2 and the catalytic reactor 3 so that they face one another for purposes of radiation heat transfer and also to allow the heated retentate stream 24 to contact the catalytic reactor 3. A manifold 116 is provided for introduction of hydrogen containing stream 34 into the permeate sides 22 of the oxygen transport membrane elements 2. A manifold 118 is provided for combining the heated combustion product stream 36 from the permeate side 22 with the reactant stream 38 and thereby form the combined stream 40 for introduction into the catalytic reactors 3. In FIG. 3, although three such oxygen transport membrane elements 2 and reactors 3 are illustrated, as mentioned above, there could be many more of such elements and reactors depending upon the industrial need. However, preferably, the oxygen transport membrane elements 2 are all in the form of a tube in which the permeate side 22 is located inside the tube and the retentate side 16 is the outer surface of the tube. As will be discussed, such tubes can be of cylindrical form, although hollow plate-like elements are possible.

Although it is possible to conduct a process in accordance with the present invention in which the retentate and permeate sides of the oxygen transport membrane elements are reversed, this would be disadvantageous in that it would be very difficult to completely combust the synthesis gas and would require that the elongated insulated reactor housing 110 to be a pressure vessel. Further, it is also possible to conduct a process of the present invention in which the oxygen containing stream 10 was compressed to provide part of the driving force for the oxygen separation. This would not be desirable because it would also require the elongated insulated reactor housing 110 to be a pressure vessel. In this regard, the illustrated elongated insulated reactor housing 110 is designed to operate at atmospheric pressure and as such, is not a pressure vessel.

In this illustrated embodiment, the oxygen containing stream 10 is introduced into opening 112 and the heated retentate stream is discharged from opening 114. In operation, the oxygen containing stream 10 contacts the retentate side 16 of the oxygen transport membrane elements 2 and becomes successively lean in oxygen as oxygen permeates to the permeate side 22 of such elements. As the hydrogen containing stream 34 reacts with the permeated oxygen, the resulting retentate stream becomes successively heated to indirectly transfer the heat generated by the oxygen transport membrane elements to the catalytic reactors 3. At the same time, the oxygen transport membrane elements 2 also radiate heat to also supply heat to the catalytic reactors 3. In fact, such radiation preferably constitutes approximately 80 percent of the heat transferred. Thus, the heat transferred as indicated by arrowheads 41 from the oxygen transport membrane elements 2 to the catalytic reactors 3 is accomplished by both radiation and convection. While, there is also some heat transferred directly, through the mixing of the heated combustion product stream 36 with reactant stream 38, this heat transfer is much less than the radiation and convective heat transfer discussed above. In fact, its importance will be negligible in the illustrated embodiment given the preheating of the reactant stream 38.

Figure 4:
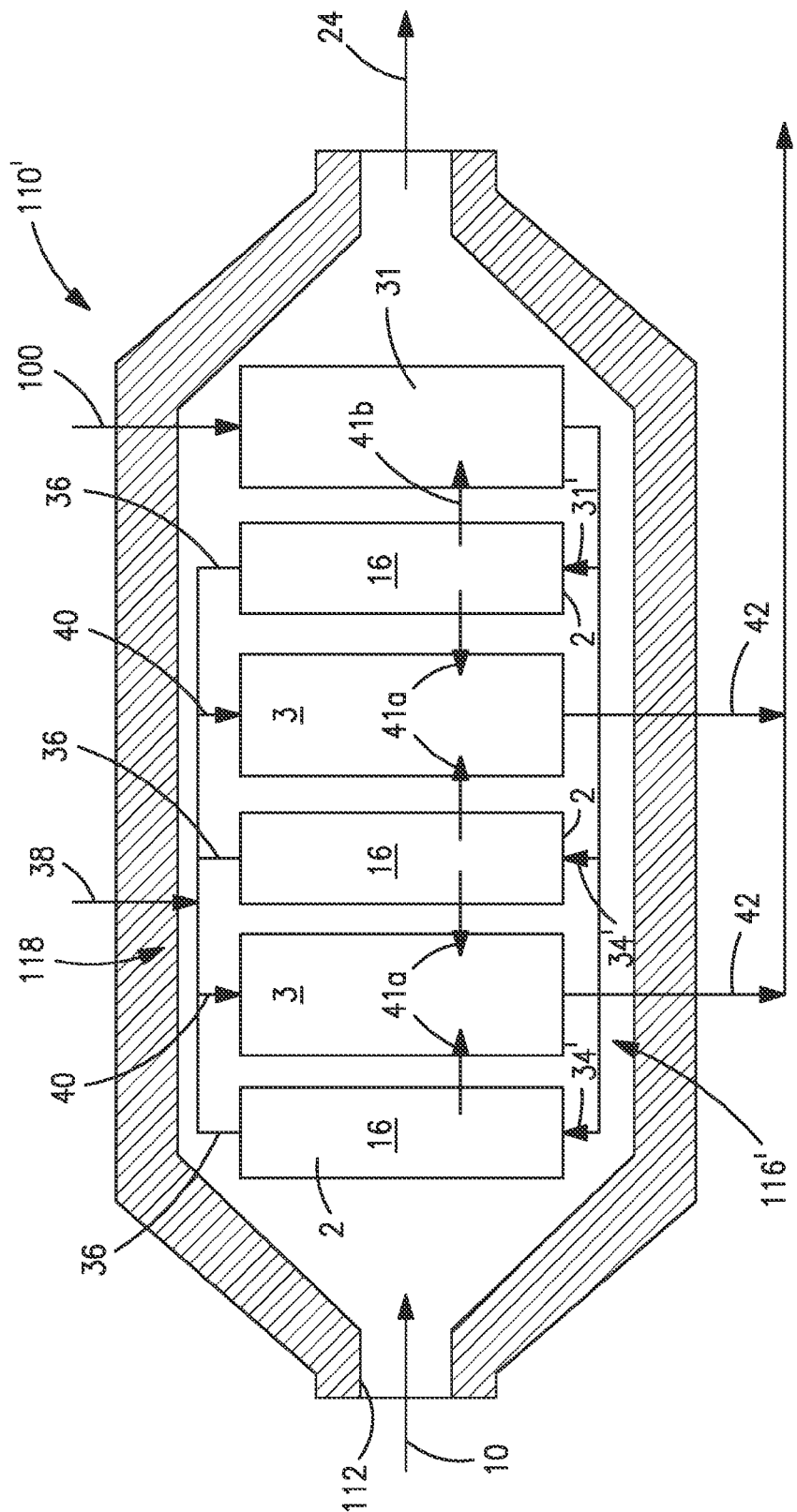
FIG. 4 is a fragmentary, schematic illustration of the apparatus of FIG. 2 showing an arrangement of oxygen transport membranes and catalytic reactors within an elongated, insulated housing.

With reference again to FIG. 2 and with additional reference to FIG. 4, the integration of catalytic reactors 3 and 3' and oxygen transport membrane elements 2 is illustrated in an elongated insulated reactor housing 110' that functions in much the same manner as elongated insulted reactor housing 110. The major difference is that at least one of the catalytic reactors 3 has been replaced by a catalytic reactor 3' that is connected to the oxygen transport membrane elements 2 by an manifold 116' for introduction of the hydrogen containing stream 34' into the permeate side 22 thereof. The catalytic reactor 3' is positioned so as also to be heated by radiation heat transfer as shown by arrowhead 42b from at least one of the oxygen transport membrane elements 16 and also, to be heated through indirect heat transfer from the heated retentate after the heated retentate has heated the catalytic reactors 3.

Figure 5:
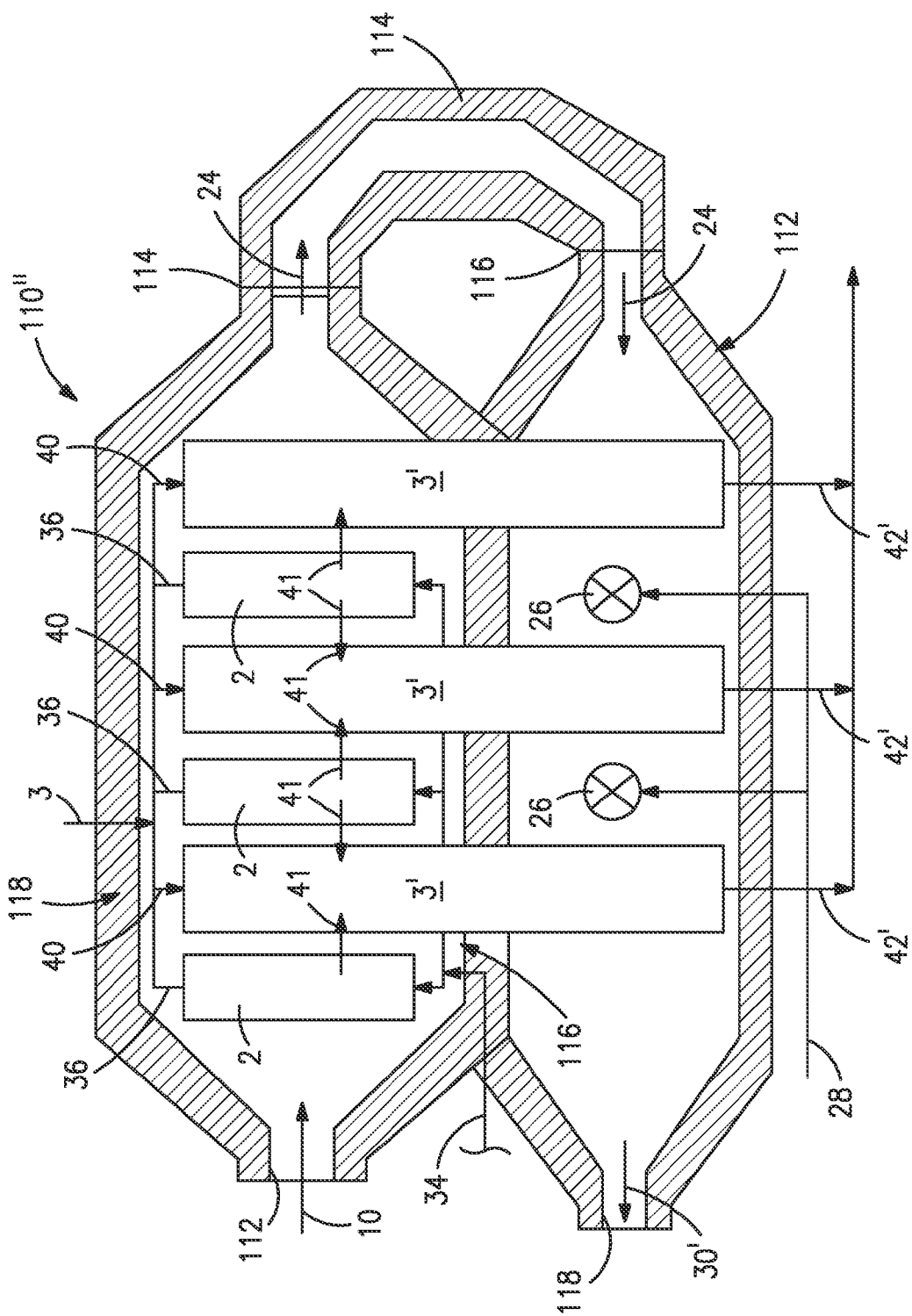
FIG. 5 is an alternative embodiment of FIG. 3.

With reference to FIG. 5, an elongated insulated reactor housing 110" is illustrated that is connected to a duct burner housing 112 by means of an insulated transfer section 114. Elongated, insulated reactor housing 110" functions in the same manner as elongated insulated reactor housing 110. In this regard, the oxygen transport membrane elements 2 transfer heat by radiation and conduction to catalytic reactors 3'. As is apparent, however, catalytic reactors 3' are longer than catalytic reactors 3 and the lengthened sections of such reactors extend into duct burner housing 112 and serve as polishing sections to subject methane slip occurring within the catalytic reactors 3' to steam methane reforming. In this regard, the duct burner housing 112 has an inlet 116 and an outlet 118 situated opposite to the inlet 116. The heated retentate stream 24, by means of transfer section 114, is introduced into inlet 116 to support combustion of fuel stream 28 introduced into duct burners 26 that are situated within duct burner housing 112. Fuel stream 28 may, as necessary, contain supplementary air to the extent necessary to support combustion. The resultant heat produced by such combustion will support endothermic heating requirements of the steam methane reforming reactions of the methane slip within the extended sections of catalytic reactors 3' projecting into duct burner housing 112. The resulting heated flue gas stream 30' is discharged from the outlet 118 and the same may be introduced into heat exchanger 12 for purposes of preheating the oxygen containing stream 10 as has been described above in connection with FIG. 1. The resulting synthesis gas stream 42' will contain hydrogen, carbon monoxide, steam and carbon dioxide, but will have a lower concentration of methane than synthesis gas stream 42. Synthesis gas stream 42' can be quenched to produce quenched synthesis gas stream 44 and the same can be processed within convective system 4 in a manner as has been described above.

In the embodiments of the present invention illustrated in FIGS. 3, 4 and 5 the oxygen transport membrane elements alternate with the catalytic reactors 3 or 3'. As can be appreciated, there could be many of such elements depending on the required output of the synthesis gas to be produced by apparatus 1. This being said, it is important that the positioning of the oxygen transport membrane elements 2 with respect to the catalytic reactors 3 be optimized for radiation heat transfer purposes. In other words, from a radiation heat transfer aspect, the catalytic reactors 3 must be in "view" of the oxygen transport membrane elements 2. At the same time, practically, for purposes of reliability and construction costs, it is also necessary to minimize the number of oxygen transport membrane elements 2.

Figure 6:
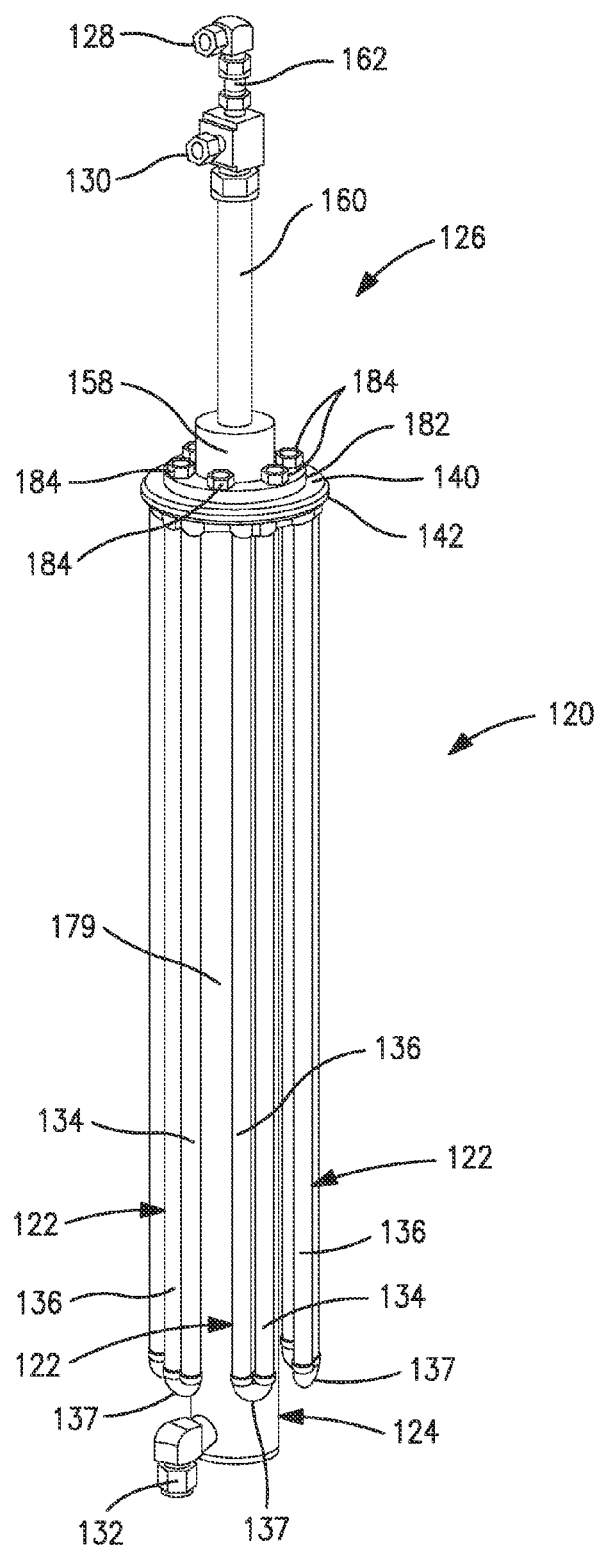
FIG. 6 is a perspective view of a module in accordance with the present invention that incorporates oxygen transport membrane tubes and a central reactor tube in an advantageous heat transfer integration.

With reference to FIG. 6, such optimization, as has been discussed above, can be effectuated by arranging the oxygen transport membrane element 2 and the catalytic reactors 3 in modules such as the illustrated reactor module 120. In reactor module 120, the oxygen transport membrane element 2 is formed by a plurality of oxygen transport membrane tubes 122 that surround a central reactor tube 124 that contains a catalyst to promote the steam methane reforming reaction and thus forms the catalytic reactor 3. A feed assembly 126 has an inlet 128 for the heated reactant stream 38; and as will be discussed, is designed to mix such stream with the heated combustion product stream produced by oxygen transport membrane tubes 122 and thereby form the combined stream 40. If several of such reactor modules 120 were used, the manifold 118 shown in FIG. 3, for example, would in part be incorporated into such structure with an additional manifold to distribute reactant stream 38 to the inlet 128 of each feed assembly 126. Additionally, an inlet 130 is provided for introducing the hydrogen containing stream 34 into the permeate side of the oxygen transport membrane tubes 122. Again, in case of several reactor modules 120, the manifold 116 would be connected to each inlet 130 of each of the reactor modules 120. Further, the oxygen transport membrane tubes 122 have the permeate side 22 within the tubes and the exterior of such tubes serve as the retentate side 16. The synthesis gas stream 42 is discharged from an outlet 132 to the reactor tube 124. As illustrated inlet 128 and inlet 130 can be formed of conventional gas-tight couplings that are attached to an outer feed tube 160 and an inner feed tube 162 to be discussed hereinafter, in a gas-tight threaded engagement known in the art.

The oxygen transport membrane tubes 122 preferably incorporates a composite structure that incorporates a dense layer, a porous support and an intermediate porous layer located between the dense layer and the porous support. Each of the dense layer and the intermediate porous layer are capable of conducting oxygen ions and electrons at an elevated operational temperature to separate the oxygen. The porous support layer would thus form the permeate side 22. The dense layer and the intermediate porous layer comprise a mixture of an ionic conductive material and an electrically conductive material to conduct oxygen ions and electrons, respectively. The ionic conductive material is composed of a fluorite. The intermediate porous layer has a lower permeability and a smaller average pore size than the porous support layer to distribute the oxygen separated by the dense layer towards the porous support layer. For example, in one embodiment, the oxygen transport membrane element is a mixed phase oxygen ion conducting dense ceramic separation layer comprising a mixture of a zirconia based oxygen ion conducting phase and a predominantly electronic conducting perovskite phase. This thin, dense separation layer is implemented on a thicker inert, porous support.

In a specific embodiment, the intermediate porous layer can have a thickness of between about 10 microns and about 40 microns, a porosity of between about 25 percent and about 40 percent and an average pore diameter of between about 0.5 microns and about 3 microns. The dense layer can have a thickness of between about 10 microns and about 30 microns. The porous surface exchange layer can be provided with a thickness of between about 10 microns and about 40 microns, a porosity of between about 30 percent and about 60 percent and a pore diameter of between about 1 microns and about 4 microns and the support layer can have a thickness of between about 0.5 mm and about 10.0 mm, but preferably 0.9 mm and a pore size no greater than 50 microns. The intermediate porous layer can contain a mixture of about 60 percent by weight of $(La_{0.825}Sr_{0.175})_{0.96}Cr_{0.76}Fe_{0.225}V_{0.015}O_{3-\delta}$, remainder 10Sc1YSZ, the dense layer can be formed of a mixture of about 40 percent by weight of $(La_{0.825}Sr_{0.175})_{0.94}Cr_{0.72}Mn_{0.26}V_{0.02}O_{3-x}$, remainder 10Sc1YSZ and the porous surface exchange layer can be formed by a mixture of about 50 percent by weight of $(La_{0.8}Sr_{0.2})_{0.98}MnO_{3-\delta}$, remainder 10Sc1CeSZ.

Catalyst particles or a solution containing precursors of the catalyst particles are optionally located in the intermediate porous layer and in the thicker inert, porous support adjacent to the intermediate porous layer. The catalyst particles contain a catalyst selected to promote oxidation of the hydrogen containing stream 34 in the presence of the oxygen when introduced into the pores of the porous support, on a side thereof opposite to the intermediate porous layer. The catalyst can be gadolinium doped ceria. Further, a porous surface exchange layer can be provided in contact with the dense layer opposite to the intermediate porous layer. In such case, the porous surface exchange layer would form the retentate side 16. The support layer is preferably formed from a fluorite, for example 3 mol % yttria stabilized zirconia, or 3YSZ.

Figure 7:
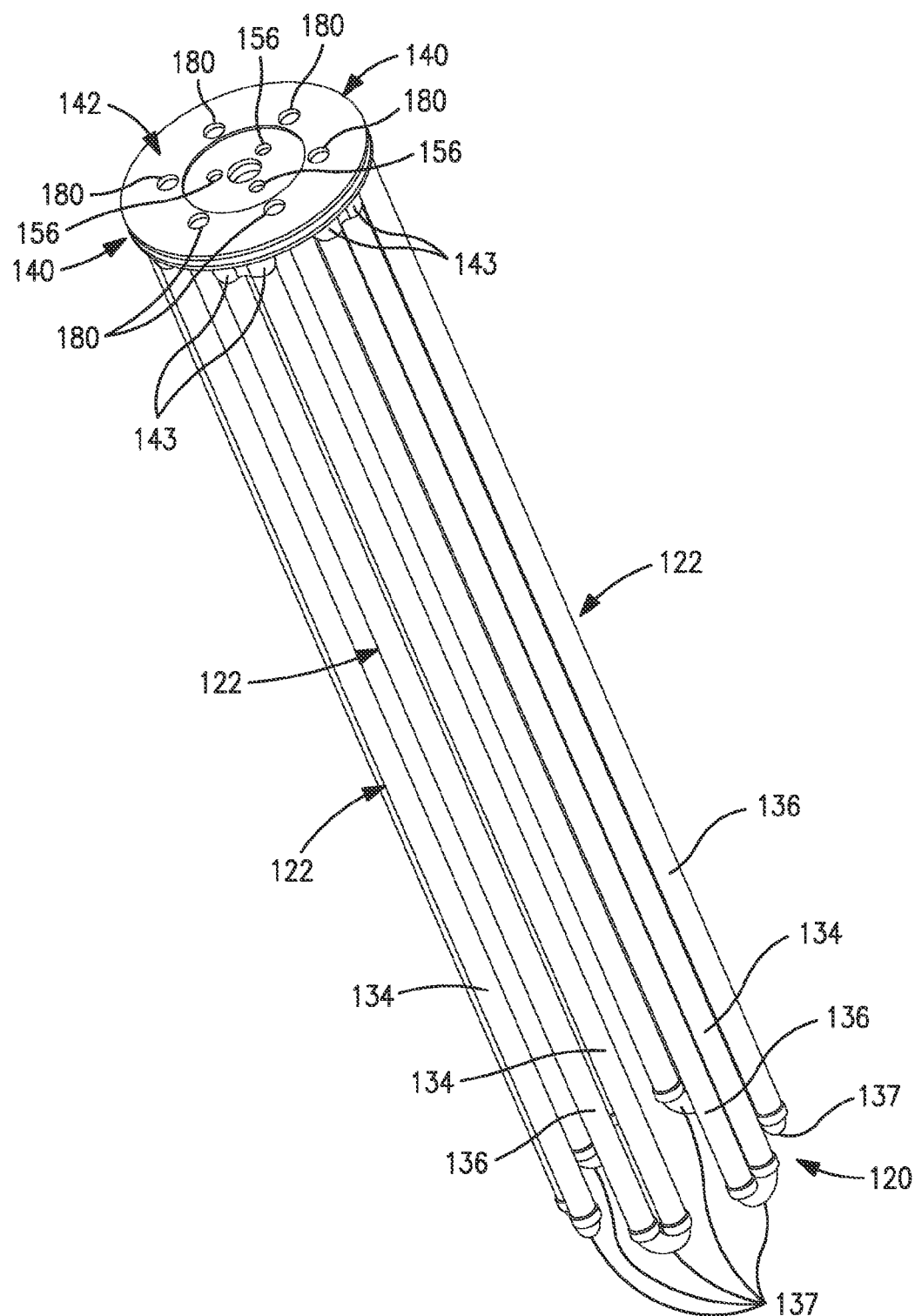
FIG. 7 is a perspective view of a sub-assembly of oxygen transport membranes used in the module shown in FIG. 6.

With reference to FIG. 7, each of the oxygen transport membrane tubes 122 consists of an inlet section 134 into which the hydrogen containing stream 34 is introduced and an outlet section 136 from which the heated combustion product stream is discharged. It is understood that reaction with the permeated oxygen and the hydrogen containing stream 34 occurs within both the inlet section 134 and the outlet section 136. The inlet and outlet sections 134 and 136 are parallel to one another and the central reactor tube 124 and are connected to one another by "U" shaped pipe-like bends 137 that are formed from dense ceramic material like YSZ or MgO—MgAl2O4. The oxygen transport membrane tubes 122 are connected to a plate-like element 138 that, in a manner that will be discussed, serves as an inlet manifold to introduce the hydrogen containing stream into the inlet section 134 and an outlet manifold to collect the heat combustion product stream 36 and introduce such stream along with the reactant stream 38 into the central reactor tube 124.

Figure 8:
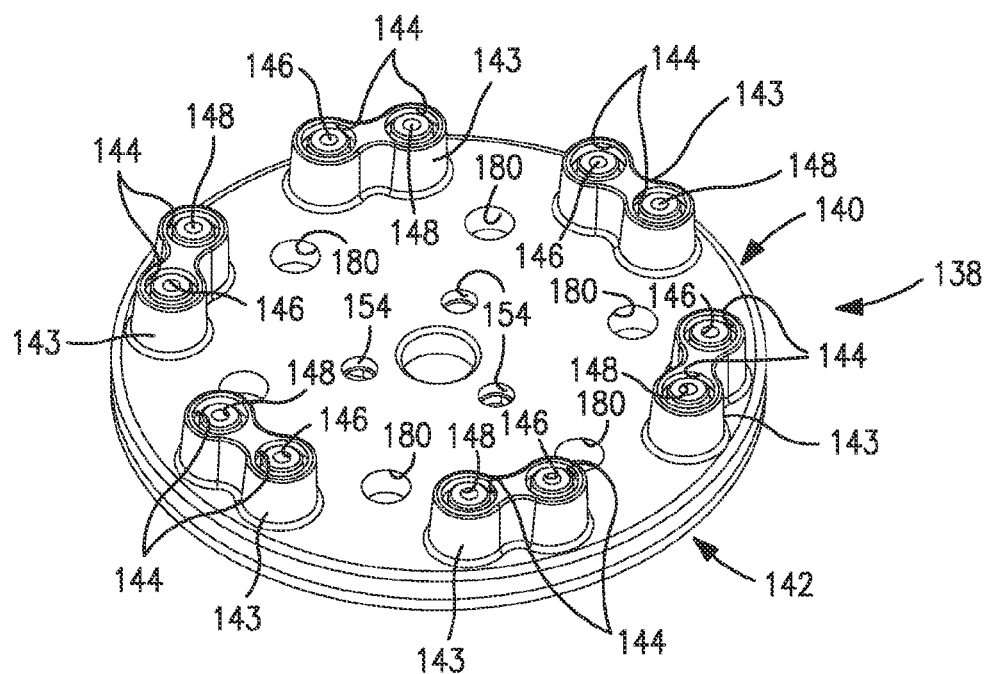
FIG. 8 is a bottom perspective view of a plate-like element utilized in the module shown in FIG. 6.
Figure 9:
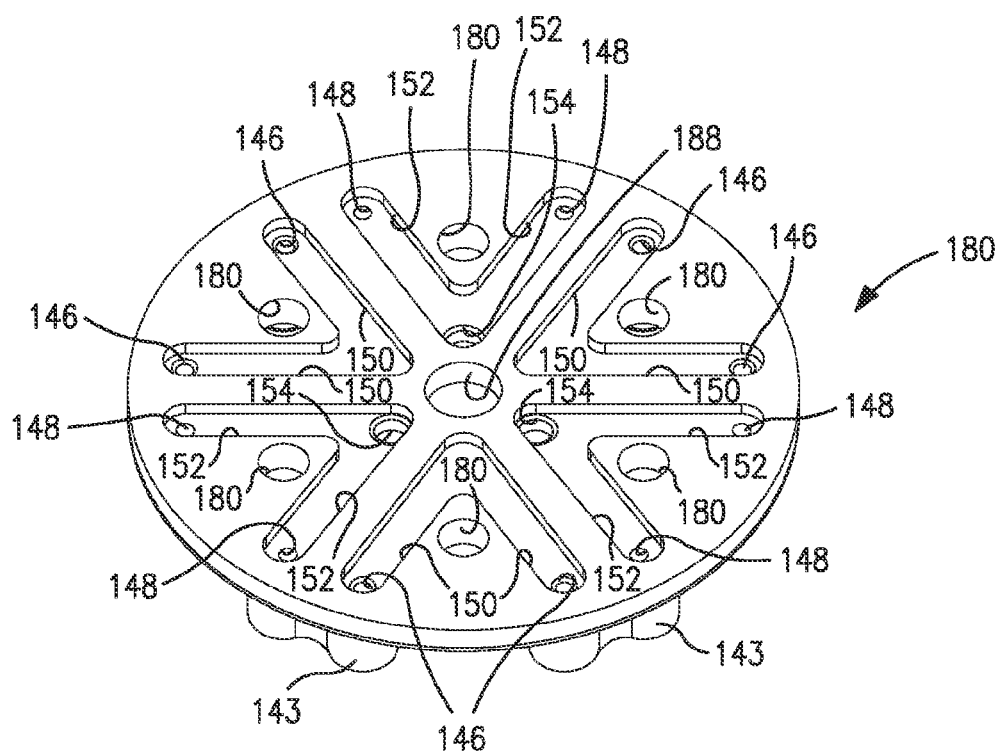
FIG. 9 is a top perspective view of a first plate used in the plate-like element shown in FIG. 8.

With additional reference to FIGS. 8 and 9, the plate-like element 138 consists of two sections formed of first and second plates 140 and 142 that are connected to one another in a juxtaposed relationship. The first plate 140 has raised bosses 143, each having circular grooves 144 to receive the ends of the inlet and outlet sections 134 and 136 of the oxygen transport membrane tubes 122. The ends of the inlet and outlet sections 134 and 136 are connected to the bosses 143 by glass or glass-ceramic seals such as baria-alumina-silcate glass seals. In this regard, both first and second plates 140 and 142 are fabricated from a ceramic having similar thermal expansion characteristics to the oxygen transport membrane tubes 122, for instance, 3YSZ or Mgo-MgAl2O4.

Pairs of axial bores 146 and 148 form inlet and outlet passages, respectively, to the inlet and outlet sections 134 and 136 of the oxygen transport membrane tubes 122. A radial arrangement of grooves 150 and 152 defined in the surface the first plate 140 form the inlet passages and the outlet passages, respectively. The grooves 150 and 152 are in communication with the bores 146 and 148 that form the inlet passages and the outlet passages to the inlet and outlet sections 134 and 136 of the oxygen transport membrane tubes 122. These elements act as inlet and outlet manifolds to the oxygen transport membrane tubes 122. When the second plate 142 is affixed to the first plate 140, the grooves 150 and 152 are covered by such plate and thereby form the inlet and outlet passages. The first and second plates 140 and 142 could be connected with a glass-ceramic seal of the type set forth above or co-fired with fugitive pore formers to form the grooves 150 and 152 or other internal manifold-like passages. Alternatively the manifold plates 140 and 142 could be formed from one monolithic block of ceramic. In a manner that will be discussed, the first plate 140 is provided with outlet openings 154 to the grooves 152 from which the heated combustion product stream is discharged to the central reactor tube 124. With brief reference to FIG. 7 and in a manner that also will be further discussed hereinafter, the hydrogen containing stream 34 is fed to the inlet passages 146 through inlet openings 156 defined in the second plate 142. The inlet openings 156 are in registry within the grooves 150 when the first plate 140 is affixed to the second plate 142. It is to be noted that although grooves 150 and 152 are provided with a chevron-like configuration, the segment making up such grooves could be segments that were not so connected. The disadvantage of this would be that there would have to be provided more inlet openings 156 and outlet openings 154.

Figure 10:
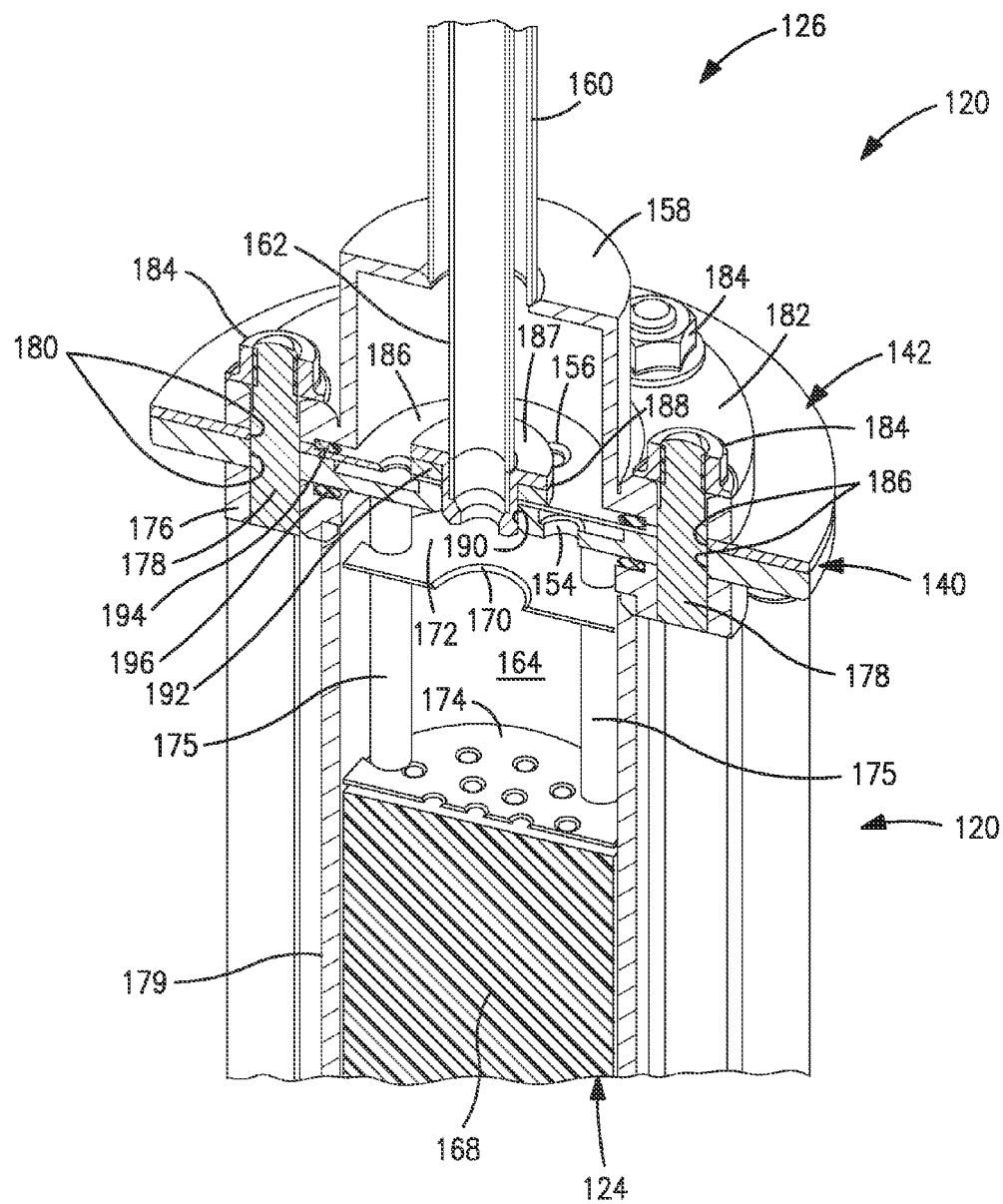
FIG. 10 is a fragmentary, perspective view of FIG. 6 with portions broken away to show internal features of the module of FIG. 6.

With reference to FIG. 10, the inlet assembly 126 has an inlet plenum 158 connected to the second plate 142 in a manner that will be discussed. An outer feed tube 160 is connected to the inlet plenum and the inlet 130 to feed the hydrogen containing stream 34 into the inlet plenum 158. The inlet plenum 158 is in communication with the inlet openings 156 in the second plate 142 to feed the hydrogen containing stream into the grooves 150 and therefore, into the inlet sections 134 of the oxygen transport membrane tubes 122. An inner feed tube 162 is coaxially positioned within the outer feed tube 160 and extends through the inlet plenum 158 to an inlet region 164 of the central reactor tube 124. The outlet openings 154 are in communication with an inlet region 164 of the central reactor tube 124 where the heated combustion product stream 36 from the oxygen transport membrane tubes 122 mixes with the reactant stream 38 to form the combined stream 40 that is fed to steam methane reforming catalyst 168 contained within the central reactor tube 124 to react and form the synthesis gas stream 42 that is discharged from the central reactor tube 162. Reforming catalyst 168 can be in the form of beads or honeycomb-like monoliths known in the art that are situated within a tubular portion 179 of the central reactor tube 124. Preferably, a restriction 170 in an internal plate 172 is positioned below the end of the inner feed tube 162 and a perforated plate 174 is located directly below the internal plate 172 to ensure mixing of the reactant stream 38 and the heated combustion product stream 36. Internal plate 172 is connected to perforated plate 174 by posts 175.

Central reactor tube 124 is provided with a flange 176 having threaded studs 178 that is connected to the tubular portion 179 of the central reactor tube 124 that contains the catalyst 168. The studs 178 pass through openings 180 within the first plate 140, the second plate 142 and a circular flange 182 connected to the plenum 158. Nuts 184 threaded onto the studs 178 hold the assembly in place. The inner feed tube 162 is connected to a nozzle 186 by a press fit and the nozzle 186 is in turn press fit through central openings 188 and 190 defined in first plate 140 and second plate 142, respectively. Nozzle 186 is provided with a shoulder 187 that compresses a washer-like seal 192 between shoulder 187 and first plate 140. Seal 192 can be formed of a ceramic felt that can be a blend of vermiculate and alumina. This arrangement of nozzle 186 and seal 192 thereby connects the inner feed tube 162 to the central reactor tube 124 in a gas-tight manner. Additionally, the flange 182 of the inlet plenum 158 is sealed to the second plate 142 in a gas tight manner by provision of a gas filled, ring-type seal 194 that is compressed between flange 182 and second plate 142. A similar gas filled, ring-type seal 196 is compressed between flange 178 of the central reactor tube 124 and the first plate 140 to seal the central reactor tube 124 to the first plate 140 in a gas tight manner.

It is to be noted that the outer feed tube 160, the inner feed tube 163 and the plenum 158 can all be formed from a chromium-containing metal, for instance, stainless steel or a nickel-based superalloy.

The tubular portion 179 of central reactor tube 124 is also preferably formed of a chromium-containing metal, for instance, stainless steel or nickel-based superalloy. In such case, a coating can be applied that serves as a barrier layer to prevent chromia migration and subsequent volatilization at the metal surface. These volatilized species will react with oxygen transport membrane tubes 122 and degrade performance. Such a coating could be a coating of a dense aluminum-oxide layer or spinel $((Mn_{0.5}Co_{0.5})_3O_4)$ provides both oxidation resistance and a chromia barrier at the surface. Alternatively, a high aluminum content alloy having more than 3 percent aluminum will form an aluminum oxide layer in a high-temperature atmosphere containing oxygen. Another possibility is to apply such a barrier coating in a known high temperature, gas phase diffusion process of nickel-aluminide (Ni3Al). This creates a uniform, dense, and permanently metallically bonded layer on the surface of the metal. When in an oxidizing atmosphere at high temperature, a protective layer of aluminum oxide will form on the surface of the metal.

As mentioned above, the central reformer tube 124 is thermally coupled to the oxygen transport membrane tubes 122 through radiation heat exchange as a dominant mode. The emissivity of the reformer tube surface is an important factor in the efficiency of this coupling. Base metal, or aluminum-oxide coatings have a surface emissivity that are too low. Generally, coatings can be used to enhance emissivity at a surface. Therefore, in addition to the barrier layer coating, a stable, high temperature coating, preferably a cerium-oxide coating can also be applied to the tubular portion 179 of central reformer tube 124 that will provide high emissivity at the surface and also not react with the oxygen transport membrane tubes 122.

Figure 11:
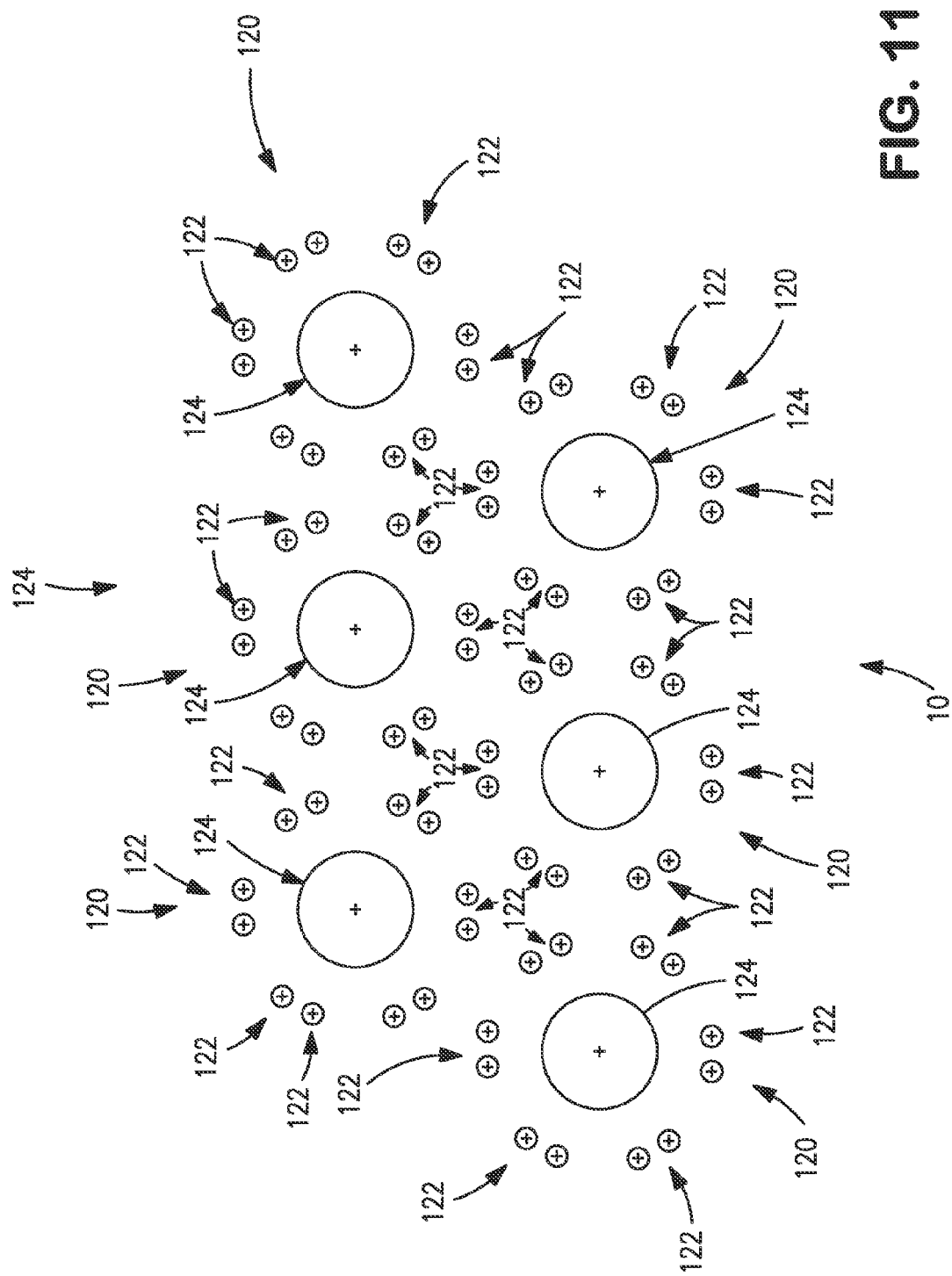
FIG. 11 is a schematic, sectional illustration of an arrangement of reactor modules shown in FIG. 6 employed in an elongated insulated reactor housing shown in FIG. 3.

With reference to FIG. 11, an arrangement of modules 120 is shown that could be positioned within elongated, insulated reactor housing 110 shown in FIG. 3. Where catalytic reactors 3' are used, such as shown in FIG. 4, such catalytic reactor 3' could be in the form of tubes incorporating the coating discussed above and positioned between the reactor modules 120. The modules in FIG. 11 are arranged in such a way that the radiant heat transfer between the oxygen transport membrane tubes 122 and the central reformer tubes 124 is sufficient to provide the heat flux required by the endothermic reforming reactions occurring within the central reformer tube 124 accounting for the small amount of convective heat transfer that is occurring as well. In the configuration shown in FIG. 11, the view factor between each of the central reformer tubes 124 and all of the oxygen transport membrane tubes 122 that face each particular central reformer tube 124 and radiate heat thereto is preferably greater than or equal to 0.5.

Figure 12:
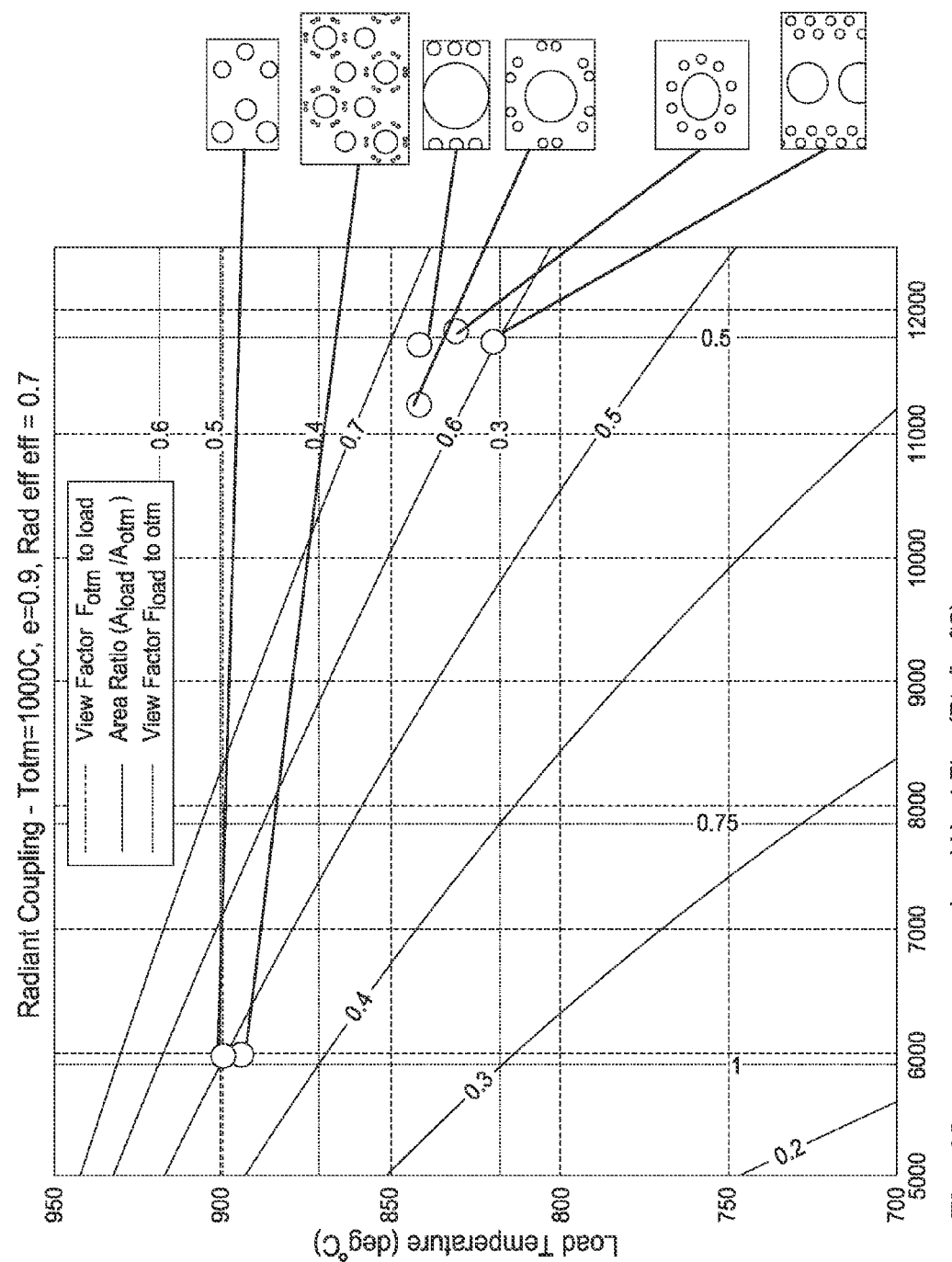

In addition to the preferred view factors, as described above and graphically shown in FIG. 12, another key system design parameter is the area ratio. The area ratio, expressed as the area of the load (e.g. central reformer tube) to the area of the radiating oxygen transport membrane elements should preferably be equal to or greater than about 0.60 and more preferably equal to or greater than about 0.75 and most preferably about 1.0 (See FIG. 12).

It is to be noted that even where modules are not employed and there exists an arrangement of oxygen transport membrane elements and catalytic reactors, the arrangement should preferably incorporate such view factor and area ratio in order to employ the present invention in an industrial setting. If such view factor and area ratio are not employed, then a resulting reactor in accordance with the present invention, while being able to manufacture a synthesis gas will, in all likelihood, not be able to provide the desired radiant heat sufficient to operate the steam reforming reaction at the targeted temperatures so as to produce the synthesis gas with a hydrogen to carbon monoxide ratio and methane slip suitable for a specific downstream process.

It is to be noted that the term "view factor" is the quantity known in the art that defines the fraction of the total energy leaving a surface that reaches another surface. The view factor is employed in an equation that is used to determine radiant heat transfer. This equation, well known in the art, is:

$$q_{12} = \epsilon \sigma A_2 F_{21}(T_1^4 - T_2^4);$$

where $q_{12}$ is the radiant heat transfer between surface 1 and 2, $\epsilon$ is the emissivity, $\sigma$ is Stefan Boltzmann constant, $A_2$ is the area of surface 2, $F_{21}$ is the view factor from surface 2 to surface 1, $T_1$ is the absolute temperature of surface 1 and $T_2$ is the absolute temperature of surface 2.

In a broad sense, the present invention may also be characterized as a system and method for thermally integrating an oxygen transport membrane and catalytic/process reactor. As shown in FIG. 13, an oxygen transport membrane system 202, preferably configured as a plurality of tubular oxygen transport membrane elements to separate oxygen from an oxygen containing stream such as air 210 contacting the retentate side 216 of the oxygen transport membrane elements 218 and produce the oxygen on the permeate side 222 of the oxygen transport membrane elements 218. The permeated oxygen is combusted with a hydrogen containing synthesis gas stream 234 also contacting the permeate side 222 of the oxygen transport membrane elements 218 thereby generating radiant heat 241, a reaction product stream 236 and a heated retentate stream 224.

In all of the illustrated embodiments, the heated retentate stream 224 is an oxygen depleted stream and is used to preheat the incoming oxygen containing stream 210 upstream of the oxygen transport membrane 202 in a heat exchanger 212 and yield a cooled oxygen depleted stream 232.

The radiant heat 241 is provided or directed to a catalytic or process reactor 203, 204, 205 disposed in a close or proximate relationship with the oxygen transport membrane system 202. As shown in FIG. 13, examples of the catalytic or process reactor include: (i) a steam reforming catalytic reactor 202 configured to receive a combined stream 240 consisting of the reaction product stream 236, a hydrocarbon containing reactant steam 238 and steam 243 in the presence of the radiant heat 241 to produce a synthesis gas stream 242; (ii) a process heater 204 configured to heat or partially oxidize a synthetic gas feed 250 in the presence of the radiant heat 241 to produce a heated synthetic gas stream 252; and (iii) a boiler or steam tube 205 configured to convert boiler feed water 260 to a steam stream 262 in the presence of the radiant heat 241.

As discussed above with reference to FIG. 12, the view factor and area ratio between the catalytic or process reactor (e.g. central process tube) and the plurality of tubular oxygen transport membrane elements radiating heat to the process tube or reactor are important design parameters. The view factor is preferably greater than or equal to 0.5 whereas the area ratio, should preferably be equal to or greater than about 0.60 and more preferably equal to or greater than about 0.75 and most preferably about 1.0 depending on the process reactor receiving the radiant heat.

An important characteristic of the oxygen transport membrane elements used in the present invention is that it is comprised of a mixed phase oxygen ion conducting phase and an electronic conducting perovskite phase. More specifically, the oxygen transport membrane element is a mixed phase oxygen ion conducting dense ceramic separation layer comprising a mixture of a zirconia based oxygen ion conducting phase and a predominantly electronic conducting perovskite phase disposed on an inert, porous refractory support layer.

While the present invention has been characterized in various ways and described in relation to preferred embodiments, as will occur to those skilled in the art, numerous, additions, changes and modifications thereto can be made without departing from the spirit and scope of the present invention as set forth in the appended claims.

The invention claimed is:

1. An oxygen transport membrane module for producing heat used in a synthesis gas production process, the module comprising:
   a plurality of tubular oxygen transport membrane elements each having a permeate side located on an outer surfaces of the tubular oxygen transport membrane element and a retentate side located on an inner surfaces of the tubular oxygen transport membrane element, the tubular oxygen transport membrane elements configured to separate oxygen from an oxygen containing stream contacting the retentate side of the plurality of tubular oxygen transport membrane elements and produce the oxygen on the permeate side of the tubular oxygen transport membrane elements and to combust the permeated oxygen with a hydrogen containing synthesis gas stream contacting the permeate side of the tubular oxygen transport membrane elements thereby generating radiant heat, a steam containing reaction product stream and a retentate stream;
   at least one catalytic reactor disposed proximate the plurality of tubular oxygen transport membrane elements and configured to receive the steam containing reaction product stream, a hydrocarbon containing reactant steam and the radiant heat and to react the steam containing reaction product stream with the hydrocarbon containing reactant stream in the presence of the radiant heat to produce a synthesis gas stream;

wherein the view factor between the at least one catalytic reactor and the plurality of tubular oxygen transport membrane elements radiating heat to the at least one catalytic reactor is greater than or equal to 0.5.

2. The module of claim 1 wherein the at least one catalytic reactor further comprises at least one reactor tube containing a catalyst to promote the steam reforming reaction, each reactor tube having an inlet at one end of each reactor tube to receive the steam containing reaction product stream and the hydrocarbon containing reactant stream and an outlet at the other end of each reactor tube to discharge the synthesis gas stream.

3. The module of claim 2 wherein the plurality of tubular oxygen transport membrane elements are positioned so as to surround the reactor tubes.

4. The module of claim 1 further comprising:
at least one inlet manifold connected to one or more of the plurality of the tubular oxygen transport membrane elements, the inlet manifold configured to introduce the hydrogen containing synthesis gas stream to the permeate side of the tubular oxygen transport membrane elements and the oxygen containing stream to the retentate side of the tubular oxygen transport membrane elements;
at least one outlet manifold connected to one or more of the plurality of the tubular oxygen transport membrane elements, the outlet manifolds configured to receive the steam containing reaction product stream; and
wherein the at least one outlet manifold is connected to the inlet of the at least one catalytic reactor to deliver the steam containing reaction product stream to the catalytic reactor.

5. The module of claim 4 wherein the at least one outlet manifold is further fluidically coupled with the hydrocarbon containing stream to mix with the steam containing reaction product stream, and deliver the combined stream to the catalytic reactor thereby to form a combined stream to undergo the steam reforming reaction.

6. The module of claim 4 wherein the retentate stream is heated from the combustion of the permeated oxygen with the hydrogen containing synthesis gas stream and heat from the heated retentate stream is indirectly transferred to the at least one catalytic reactor.

7. The module of claim 4 wherein the retentate stream is heated from the combustion of the permeated oxygen with the hydrogen containing synthesis gas stream and heat from the heated retentate stream is used to preheat the oxygen containing stream.

* * * * *